Patented Jan. 9, 1934

1,942,892

UNITED STATES PATENT OFFICE 1,942,892

INSECTICIDE AND INSECTIFUGE

Elmer W. Adams and George M. McNulty, Hammond, Ind., assignors to Standard Oil Company, Chicago, Ill., a corporation of Indiana No Drawing. Application June 29, 1931
Serial No. 547,792

12 Claims. (Cl. 167—22)

This invention relates to a new composition of matter exhibiting insecticidal and insectifugal properties, and particularly an insectifuge for insect pests such as flies.

We have found that the esters of furoic or furancarboxylic acid (of the molecular formula $C_4H_3O.COOR$, wherein R is an organic residue) are effective insecticides and insectifuges; that they do not produce dermatitis; and they may be effectively used as insecticides and insectifuges in oil emulsions, oleagenous compositions and mineral oil sprays. Also the furoic acid esters may be used in combination with other insecticidal and insectifugal compositions such as a mineral oil solution containing pyrethrum and the like.

The insecticidal and insectifugal properties of the furoic acid esters have been compared with other compositions that exhibit insecticidal and insectifugal properties, and the results from these tests of relative effectiveness conclusively establish that the furoic acid esters are more effective in most instances. Among the compounds, possessing insectifugal properties, compared with the furoic acid esters were the alkylphthalates, and particularly dibutyl phthalate.

The relative effectiveness of the insectifugal properties of the furoic acid esters and other compounds, dibutyl phthalate for example, may be very clearly illustrated by the following method and apparatus: A glass tube about twenty inches long and three inches in diameter with a one-half inch hole cut in the middle was used as a testing cage. A small dish containing a 2% solution of a furoic ester in white oil was placed at one end of the tube and at the other end was placed a small dish of a 2% solution of dibutyl phthalate in white oil. The ends of the tube were closed with rubber stoppers through which a glass tube passed and dipped into the small dish of oil solution. A convenient number of flies were introduced through the hole in the middle of the tube and a slow stream of air was bubbled through each solution. The hole in the center of the tube remained open during the test to provide an exit for the air and vaporized materials. After the flies had remained in the tube for a short time they would congregate in the end of the apparatus that contained the material exhibiting the least repellent effect.

The following table shows the results obtained when the repellent effectiveness of the alkyl, aryl, hydroaryl and aralkyl ester of furoic acid was compared with the repellent effectiveness of dibutyl phthalate.

Table I

| | No. of flies in phthalate end | No. of flies in furoate end | Relative effectiveness |
|---|---|---|---|
| 1 | Dibutyl phthalate 12 | Methyl furoate 4 | 3 |
| 2 | Dibutyl phthalate 10 | Ethyl furoate 3 | 3.3 |
| 3 | Dibutyl phthalate 12 | Butyl furoate 2 | 6 |
| 4 | Dibutyl phthalate 6 | Benzyl furoate 3 | 2 |
| 5 | Dibutyl phthalate 11 | Cyclohexyl furoate 2 | 5.5 |
| 6 | Dibutyl phthalate 10 | Phenyl furoate 4 | 2.5 |

From the above table it is readily seen that the repellent effect of the furoic acid esters is from two to six times greater than that of dibutyl phthalate. In addition to the above named esters we may use amyl furoate, hexyl furoate, heptyl furoate, octyl furoate, tolyl furoate, and furyl furoate, etc.

For the purpose of this invention the furoates may be dissolved in mineral oils of any desired viscosity or A.P.I. gravity, and the concentration of the furoic acid esters may be varied according to the strength needed for the particular insect or circumstances. If the furoates are used as insect repellents, white oil, which is a non-irritant, refined oil, having a viscosity from 70 to 90 Saybolt at 100° F. can be used as a suitable vehicle, and the foroic esters may be used in concentrations from 1 to 10%. The following composition has been found very effective as a cattle fly repellent.

Example 1

White mineral oil, 80–85 Saybolt viscosity at
  100° F _____ 96%
Butyl furoate _____ 4%

Also we have found that a quick-acting insecticidal and insectifugal composition can be produced by adding the furoic esters to a mineral oil solution containing the oil soluble principles from pyrethrum flowers.

Example 2

| | |
|---|---|
| White mineral oil (80–85 Saybolt viscosity at 100° F.) containing the active principles from ¼ to 2 pounds of pyrethrum flowers | 96% |
| Butyl furoate | 4% |

Instead of using butyl furoate, as set forth in the above two examples, we may use any of the esters of furoic acid, for example, amyl furoate, octyl furoate, benzyl furoate, cyclohexyl furoate, tolylfuroate, furyl furoate, phenyl furoate and the like. Also the concentration of the furoates may be varied without departing from the scope of the invention as herein described.

Other compounds may be added to the insecticidal and insectifugal composition for the purpose of lending stability to the composition, for example, small amounts of stabilizers such as hydroquinone and other phenolic compounds may be used with those esters which have a tendency toward discoloration on aging.

It should be appreciated that the furoates have wide application as insecticides and insectifuges and the above examples are not to be considered as limitations upon the scope of the invention.

We claim:

1. A composition of matter exhibiting insecticidal and insectifugal properties comprising a furoic acid ester.
2. An insectifuge comprising a furoate of the following molecular formula, $C_4H_3O.COOR$, in which R stands for a cyclic organic residue containing six carbon atoms.
3. An insectifuge comprising an aryl furoate.
4. An insectifuge comprising an aralkyl furoate.
5. An insectifuge comprising an alkyl furoate.
6. An insectifuge comprising a butyl furoate.
7. An insectifuge comprising a mineral oil and a furoic acid ester.
8. An insectifuge comprising a mineral oil and an alkyl furoate.
9. An insectifuge comprising a non-irritant, highly purified mineral oil and a furoic acid ester.
10. An insectifuge comprising a cyclohexyl furoic acid ester.
11. An insectifuge comprising a benzyl furoic acid ester.
12. A pyrethrum insecticidal and insectifugal composition containing a mineral oil solution of a furoic acid ester.

ELMER W. ADAMS.
GEORGE M. McNULTY.